US009454915B2

United States Patent
Aldossary et al.

(10) Patent No.: US 9,454,915 B2
(45) Date of Patent: Sep. 27, 2016

(54) ELECTRO TACTILE COMMUNICATION APPARATUS, METHOD, AND COMPUTER PROGRAM PRODUCT

(71) Applicant: Thieab Ibrahim Aldossary, Oxford (GB)

(72) Inventors: Thieab Ibrahim Aldossary, Oxford (GB); Mohamad A. Zeidan, Austin, TX (US)

(73) Assignee: Thieab Ibrahim Aldossary, Oxford (GB)

( * ) Notice: Subject to any disclaimer, the term of this patent is extended or adjusted under 35 U.S.C. 154(b) by 33 days.

(21) Appl. No.: 14/464,068

(22) Filed: Aug. 20, 2014

(65) Prior Publication Data

US 2016/0055726 A1    Feb. 25, 2016

(51) Int. Cl.
    *G08B 6/00*      (2006.01)
    *G09B 21/00*      (2006.01)

(52) U.S. Cl.
    CPC ............... *G09B 21/003* (2013.01); *G08B 6/00* (2013.01); *G09B 21/005* (2013.01)

(58) Field of Classification Search
    CPC ........................................................ G08B 6/00
    USPC ..................................................... 340/407.1
    See application file for complete search history.

(56) References Cited

U.S. PATENT DOCUMENTS

| | | | | |
|---|---|---|---|---|
| 2006/0058072 | A1* | 3/2006 | Buren ................. | H04B 1/3877 455/572 |
| 2012/0028577 | A1* | 2/2012 | Rodriguez ....... | H04N 21/44008 455/41.1 |
| 2012/0116672 | A1* | 5/2012 | Forutanpour .......... | G01C 21/20 701/431 |
| 2014/0038139 | A1* | 2/2014 | AlDossary ........... | G09B 21/001 434/114 |
| 2015/0123774 | A1* | 5/2015 | Ioffreda .................... | H04R 3/00 340/407.1 |
| 2015/0364018 | A1* | 12/2015 | Mirov ....................... | G08B 6/00 340/407.1 |

* cited by examiner

*Primary Examiner* — Brent Swarthout
(74) *Attorney, Agent, or Firm* — Oblon, McClelland, Maier & Neustadt, L.L.P.

(57) ABSTRACT

A tactile communication apparatus that includes a signal receiver configured to decode data received via a wireless signal a plurality of electro tactile pads on one side, each pad configured to respectively activate and deactivate to form a plurality of pad combinations based on a plurality of activation signals, and a communication processor configured to generate the plurality of electro tactile pad activation signals based on the received data so as to convey the data to a user through the plurality of pad combinations of the tactile communication apparatus.

20 Claims, 19 Drawing Sheets a. Wave Pattern b. Pulse Pattern c. Circle Pattern d. Direction Pattern e. Twist Pattern

ELECTRO TACTILE COMMUNICATION APPARATUS, METHOD, AND COMPUTER PROGRAM PRODUCT

FIELD OF THE DISCLOSURE

Embodiments described herein relate generally to an apparatus, method, and computer program product for tactile communication. More particularly, the embodiments described relate to an apparatus that can facilitate data communications for users who are occupying the use of their visual and auditory senses, to apply a tactile sensation to their visual and auditory experience and the visually impaired.

SUMMARY

According to an embodiment, there is provided a tactile communication apparatus that includes a signal receiver configured decode data received via a wireless signal, a tactile communication device containing a plurality of electro tactile pads on one side, each electro tactile pad is configured to respectively activate and deactivate to form a plurality of combinations based on a plurality of activation signals, and a communication processor configured to generate the plurality of electro tactile activation signals based on the received data so as to convey the data to a user through the plurality of electric conductive surfaces (electro tactile pads) activation combinations of the tactile communication apparatus.

According to another embodiment, there is also provided a method of tactile communication The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

DETAILED DESCRIPTION OF THE EMBODIMENTS

Figure 1:
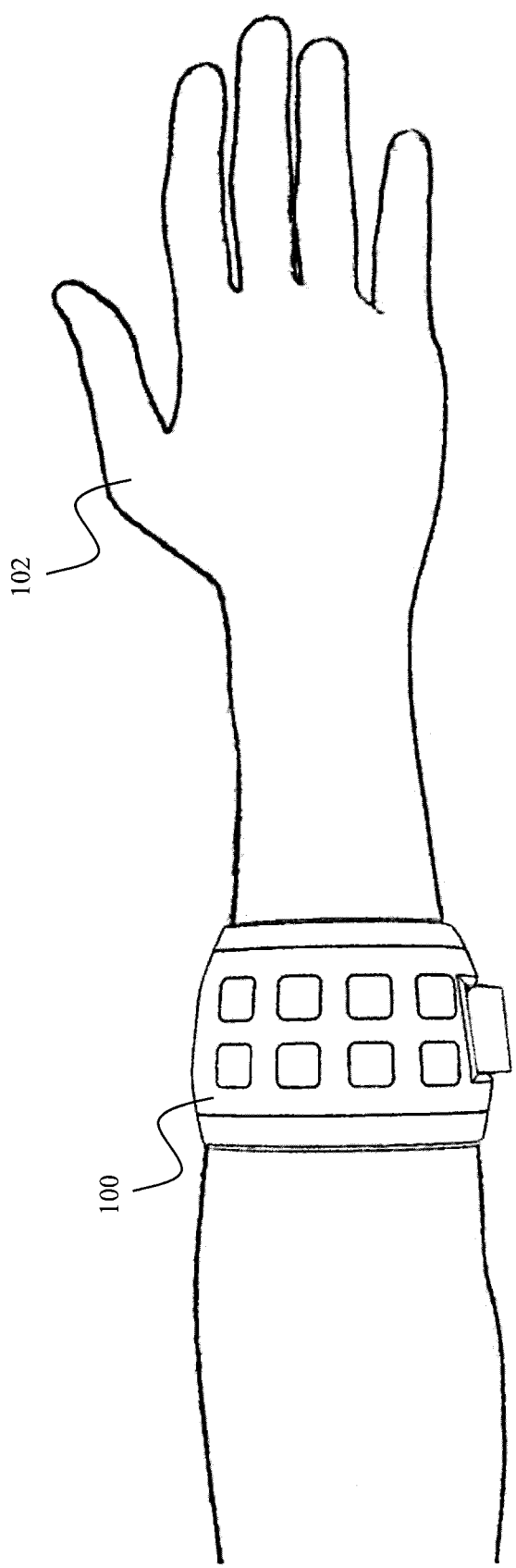
FIG. 1 is an illustration of a tactile communication apparatus being worn by a user showing an exemplary embodiment and position for use on the user.

Tremendous developments have occurred with mobile communication devices in a very short time frame. However they have been dependant on the users' visual or auditory senses to interact with them often causing the user to have to pause whatever they are doing to use the device. Tactile communication allows the users to feel the information, enabling less disruption to their physical activities in certain cases.

The present inventors recognized the need to improve the way information can be communicated discreetly to individuals without interruption to their visual and auditory activities and to assist navigation and communication while they are in motion. With the way computer technology is advancing and the way it is changing the lives of people, adequate methods of communication need to be established to tackle issues especially in a mobility situation.

The tactile communication apparatus is designed to communicate data such as patterned sensations in a physical or tactile manner. Tactile patterns can be communicated, for example, in the form of waves, ripples, twists, vibrations and directions in the form of directional tactile indication. The tactile communication apparatus combines both a hardware unit to work alongside computer software. It is designed to be versatile in the sense that it can work with several software programs as well as wired and wireless networks. Along with patterned and directional communications, the tactile communication apparatus is able to interact with the surrounding environment to communicate additional data such as GPS navigation, automobile interaction, social networking through digital touch, tactile music equalization, video game interaction, customized alerts, object/location recognition, and identification, obstacle detection, etc.

The tactile communicator introduces a new way of communication to mobile Smartphone users in such a way that their visual and auditory senses are not interrupted. The communication method is discrete, light, easy to use, unrestrictive and very useful for a number of applications in an outside mobile environment.

Referring now to the drawings, wherein like reference numerals designate identical or corresponding parts throughout several views.

FIG. 1 illustrates a front view of a tactile communication apparatus 100 being worn by a user 102 according to an exemplary embodiment. The tactile communication apparatus contains a number of parts within a protective casing. The apparatus is worn on the upper forearm of the user, it processes signals and data from external sources and generates electro tactile pad activation signals based on the data to be communicated to a user 102. The tactile communication apparatus 100 receives electro tactile pad activation signals and activates a plurality of electro tactile pad combinations in a particular sequence to physically communicate data to the user 102 through a electro tactile sensation and/or haptic mechanism (e.g., vibration).

Figure 2A:
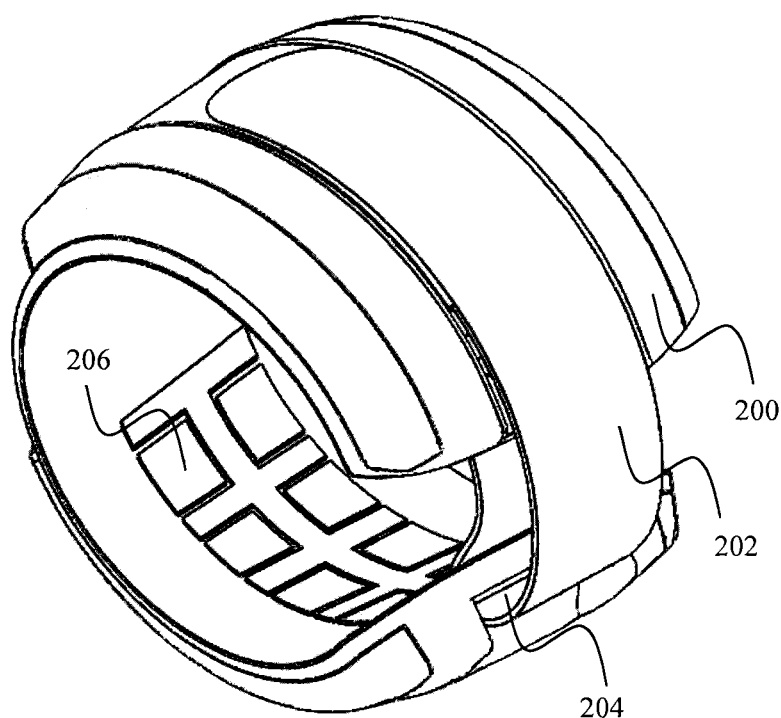
FIGS. 2A and 2B illustrate a top view and side view, respectively, of a tactile communication apparatus according to an exemplary embodiment.

FIG. 2A illustrates the tactile communication apparatus 100 from an upper side angle. It shows the outer protective case of the apparatus 200, a strap for fitting the apparatus on the users arm 202, a strap opening 204 and conductive electro tactile pads 206. The strap illustrated in FIG. 2A shows a method of attaching the device on to the user, it illustrates a strap that is attached on one inside of the apparatus case 200, the strap feeds through an opening 204 and attaches to the outer side of the casing 200 using a reattaching method such as Velcro or an alternative method for attaching straps. The method of using a reattaching strap is an exemplary and does not limit to the tactile communication apparatus 100 attachment method on to the user as other methods such as attachment clips, fixtures, clams or any other attachment method can provide adequate grip on the user. Section 206 groups a number of electro tactile pads that are fixed on the inside of the electro tactile apparatus 100, the pads can be made from electro conductive material such as copper, gold, silver, nickel, aluminum or stainless steel plated metal, etc. The electro tactile pads are sectioned up into a number of small, flat surfaces that enable the user to feel individual electronic pulses in multiple locations from the individual electro tactile pads. The tightening of the strap 202 pulls the electro tactile section into firm contact with the users skin enabling the electronic pulses to be felt clearly on the users arm.

Figure 2B:
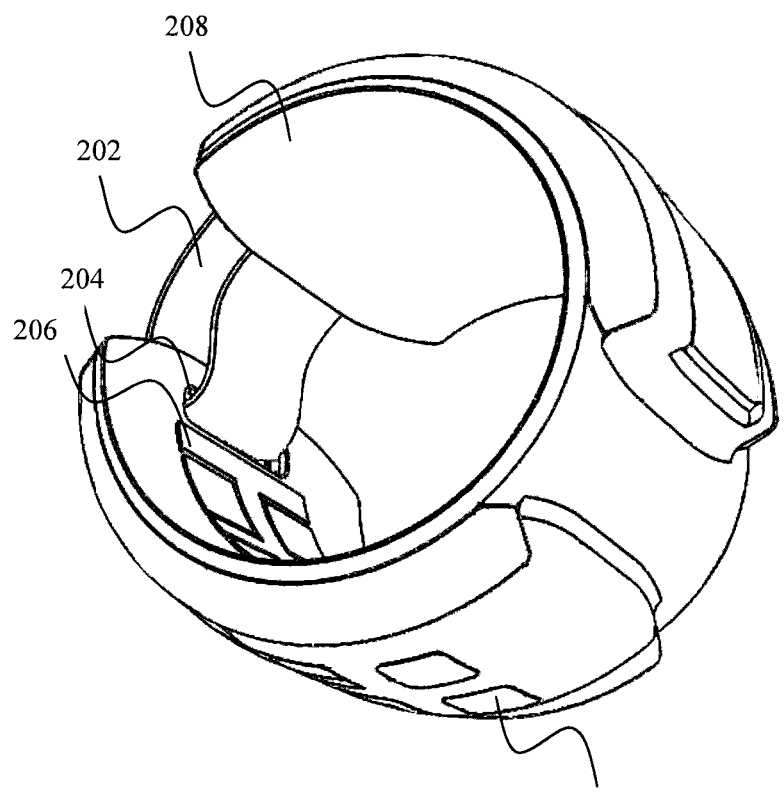

FIG. 2B illustrates the tactile communication apparatus 100 from a lower side angle. It shows some of the inner details of the apparatus such as the strap opening 204 from the inside, an inner seal 208 that encases the circuit components inside the cover and provides comfort to the user when the apparatus is tightened around the arm, it also helps grip the apparatus 100 on to the users forearm to keep it firm in place. The inner seal 208 maybe molded or shaped to fit a users forearm and can be made from a variety of materials such as rubber, plastic or fabric. 210 illustrates a panel on the outside case of 200 that contains illuminating lights, each light functions simultaneously with a corresponding electro tactile pad on the inside section of the electro tactile apparatus 100. The illuminating light panel 210 enables the physical sensations of the electro tactile pads 206 to be visible to the user and others.

The tactile communication device 100 is ergonomically designed, as illustrated in FIGS. 2A & B which show the inside section of the tactile communication apparatus corresponding to FIG. 1, so as to comfortably and completely contour to the shape of the user's forearm. This allows a more efficient and effective method of tactile communication with the user 102 because the electro tactile pads 206 of the tactile communication apparatus 100 are more likely to come into contact with the user 102 and the user 102 is more likely to understand and recognize the sequence of pad activations from the tactile communication device 100.

Figure 3:
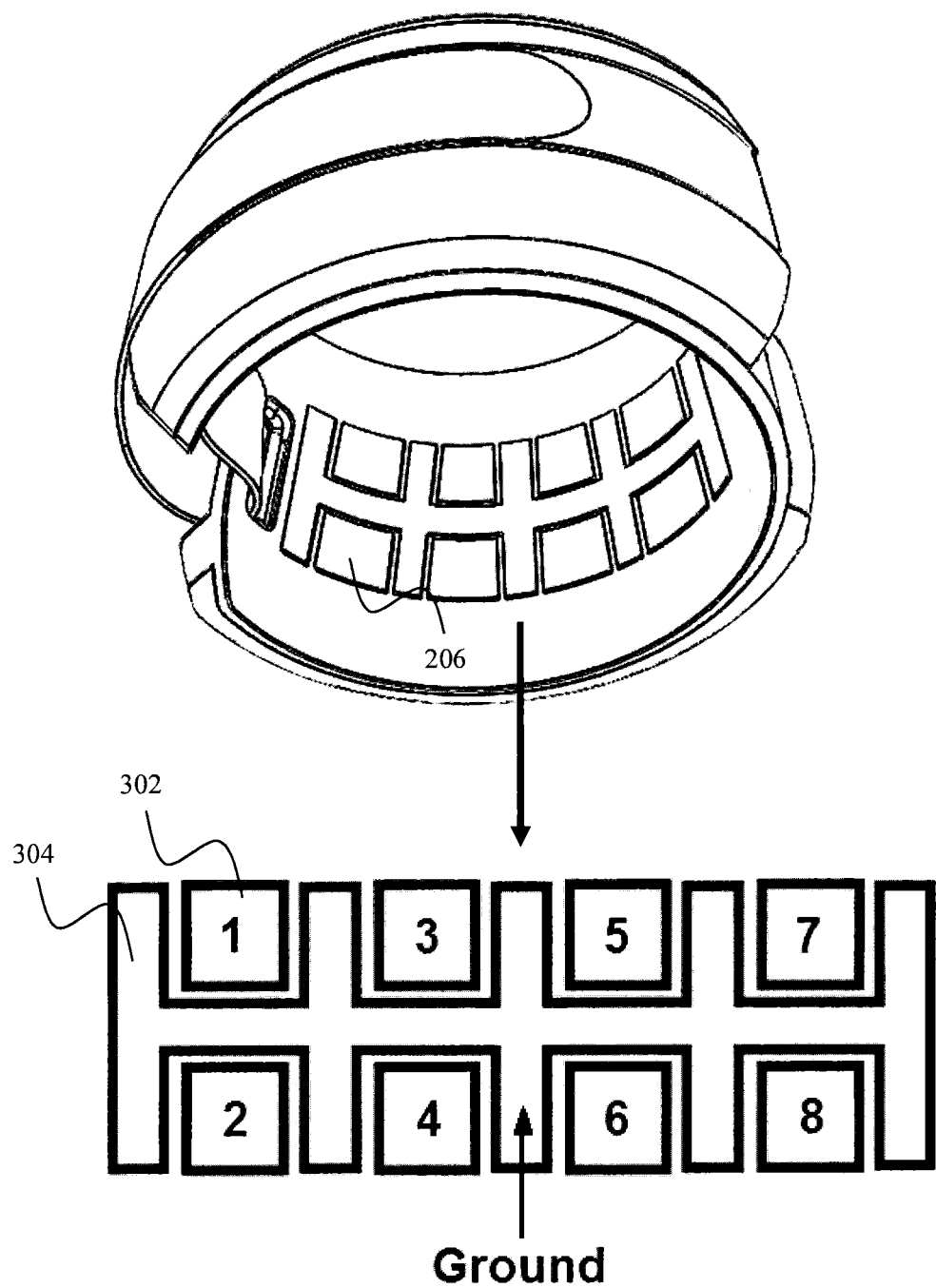
FIG. 3 illustrates an arrangement of electro-tactile pads of the tactile communication apparatus according to an exemplary embodiment.

FIG. 3 illustrates the electro tactile section and an exemplary configuration for electro tactile pads 206 whereby the user can feel pulses from each pad through a localized current passing from an individual pad 302 demonstrated by numbers from 1 to 8, to a 'ground' cross strip 304. The configuration can be adapted to include more pads, they can be configured to alternative sizes or shapes. In the tested configuration illustrated in FIG. 3 each tactile pad 302 numbered 1 to 8 had a measured surface area of 12 mm by 12 mm with the ground section measuring 6 mm in width along the strip 304. In the illustrated exemplary embodiment shown in FIG. 3 the electro tactile pads 206 are made from a thin flexi board material whereby one side has an etch able copper surface enabling the pad surfaces 302 and ground strip 304 to be etched out from the flexible copper material. The flexible property of the material for electro tactile pads 206 enables it to bend to the shape of the user's forearm and make firm contact with the user enabling more efficient and effective communication.

Figure 4:
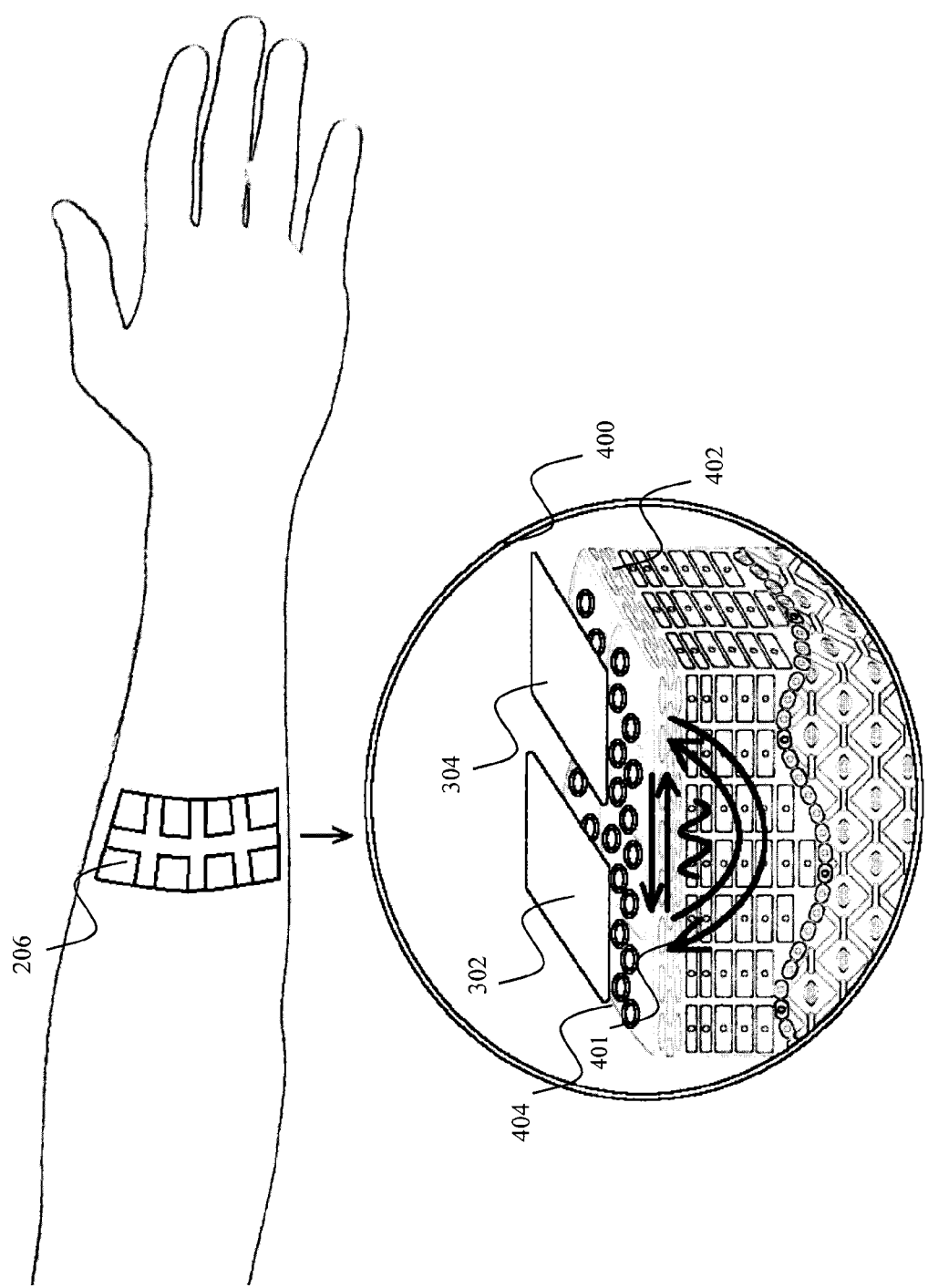
FIG. 4 is an exemplary depiction of localized electro current passing from an electro tactile pad through a skin surface to a ground enabled electro tactile pad according to an exemplary embodiment.

FIG. 4 is an illustration of the electro tactile pads 206 transferring localized current to the user enabling the user to feel a sensation in a specific point on the arm. A circular window image 400 illustrates the electro tactile pads 206 on the arm magnified to show the current passing inside of the arm. One of the numbered pads 302 activates allowing a current 401 to pass through the user's skin 402 to the ground pad 304. This localized current may have a peak strength of 60 milliamps, and the dynamically-set voltage that induces the current can range from 5V to 30V, however tests conducted in the demonstrated configuration shows that for most users the voltage range is limited to 10V to 18V. Tests also concluded that inserting a conductive substance 404 such as a cream or gel mixed with a measured amount of salt (for example 1 gram of salt in 20 grams of lotion) greatly increased the conductivity of the current enabling the sensation felt by the user effectively.

Figure 5:
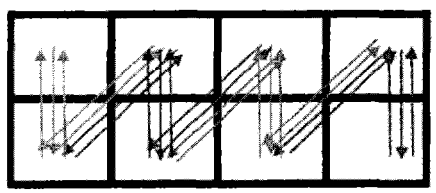
FIG. 5 visually illustrates tactile sensation patterns that a user can feel through the electro tactile pads according to an exemplary embodiment.
Figure 5:
Figure 5:
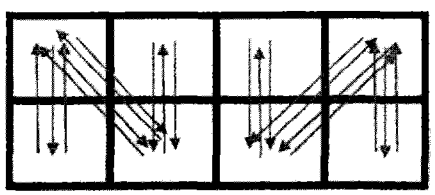
Figure 5:
Figure 5:
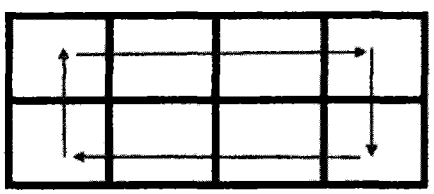
Figure 5:
Figure 5:
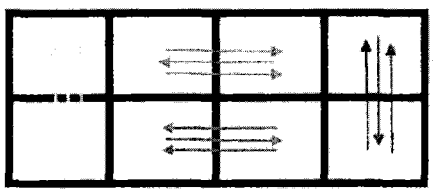
Figure 5:
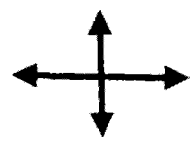
Figure 5:
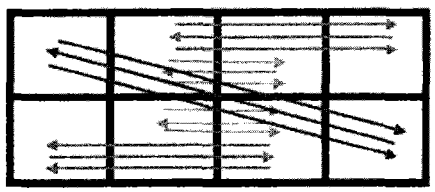
Figure 5:

FIG. 5a-e illustrate a number of graphical depictions of patterns that can be generated by the tactile communication apparatus 100 for the user 102 to feel. As each pad is capable of switching on and off a thousand times a second, many different combinations of patterned sensations can be made and alternative variations of the same pattern can be generated such as a wave sensation moving from left to right or from right to left, etc. FIG. 5a illustrates a wave pattern, in the illustrated example the pattern moves from the right to left in an up and down motion to relay a ripple sensation in a particular direction. On the left side of FIG. 5 shows diagrams of the electro tactile pads 206 and the sequence in which the pads turn on and off. The arrows indicate direction that the sequence follows, in the wave pattern in FIG. 5e the arrow starts from a lower right pad and goes up, then back down, then up, then one on the left of the lower pad, then back to the upper right pad, then to the lower right pad. This process continues until the pattern reaches the left side of the tactile pad, when the process is performed at a fast pace, a wave or ripple sensation can be felt as illustrated in the image on the right side of FIG. 5. The length of time for each pad 302 can be adjusted, the speed of the pattern being generated can be controlled to a fast or slow pace depending on the information that is needed to be communicated. FIG. 5b labeled 'Pulse Pattern' illustrates a sensation that begins from the center pads and moves outwards to the outer pads. This pattern can be used to relay such information as a person's pulse or heart beat, bass in a song, or it can be used to set a tempo to follow. FIG. 5c illustrates a circular sensation that has a pattern that moves around the pad in a circular motion, this may be used for a number of applications such as a notification or an indication of an event. FIG. 5d shows the pads being used to indicate direction, with each two pads being used to indicate an up, down, left or right direction. This can be used for example to guide a user on a route to follow or the location of an object, this information can be received from an application such as map guidance system like GPS navigation or a similar guidance application. FIG. 5e illustrates a twist pattern that also begins from the inner pads and moves outwards in a circular direction.

Figure 6:
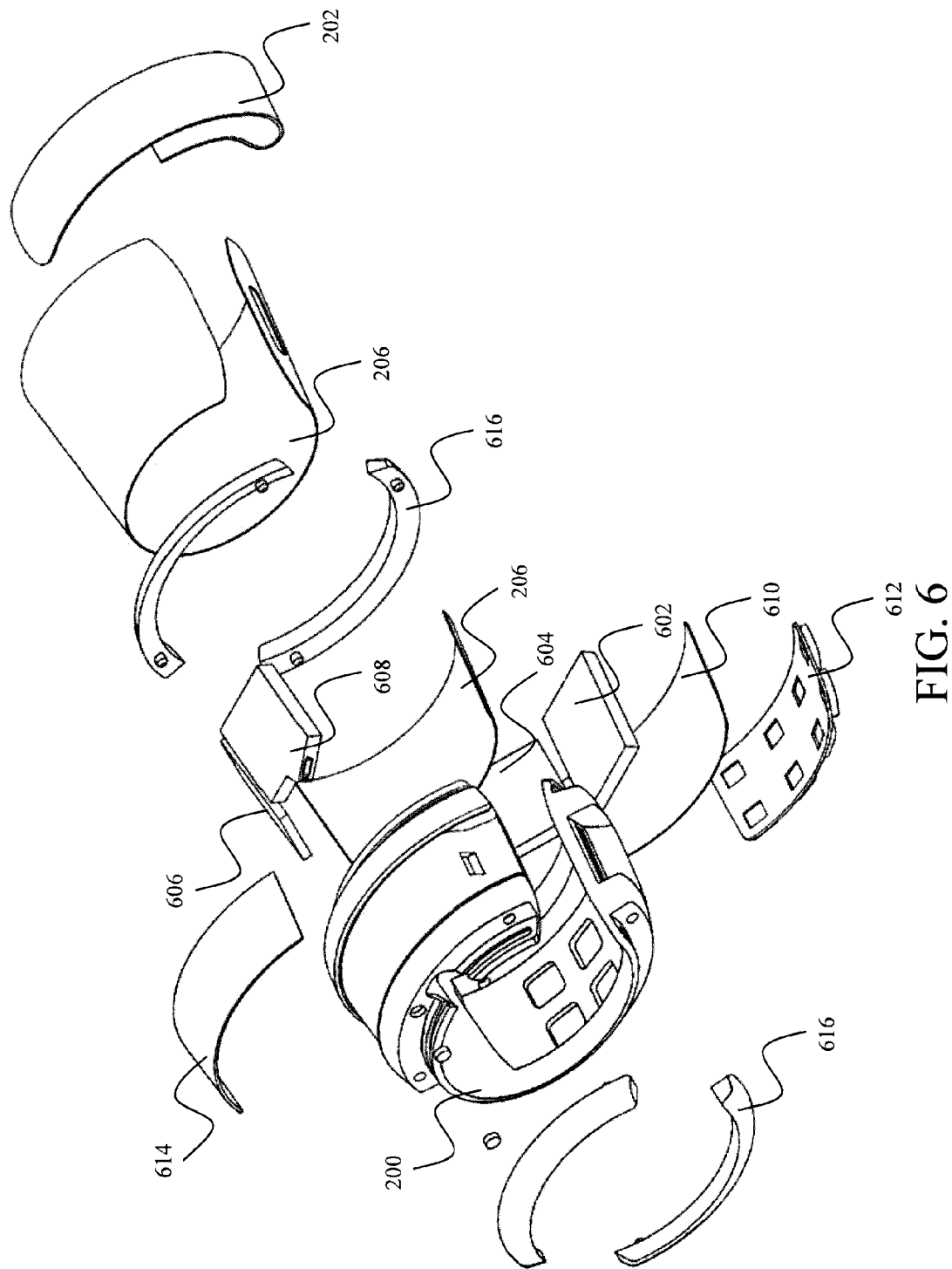
FIG. 6 illustrates an exploded view of an exemplary component configuration of the tactile communication apparatus.

The patterns illustrated in FIG. 5 are just some examples of possible combinations that can be performed when using the tactile communication apparatus 100. Multiple combinations can be programmed to be sent to the user, different patterns can be sent after each other, they can be mixed together, they can be reversed and sped up or slowed down, etc. Developers of applications to be used with the tactile communication apparatus 100 platform can create the patterns or sensations they wish to communicate through their software applications. FIG. 6 is an exploded view the exemplary design of the tactile communication apparatus 100. It illustrates both internal and external parts configured to receive data through a wireless connection, process information and relay it to the user through the electro tactile pads 206. FIG. 6 illustrates the internal components of the of the communication apparatus 100, the illustration depicts four main internal components situated inside the casing of the tactile communicator apparatus 200. The first is a signal receiver and processor 602, this component can receive data from any number of wired or wireless inputs. Such wired inputs may be received via a network cable, fiber optic cable, USB cable, firewire cable, or the such. Wireless inputs may be received from any form of wireless network such Bluetooth, WiFi, cellular, or near field communication type systems and associated protocols. Once a signal from a wired or wireless network is received by the signal receiver and processor 602, it is processed by the appropriate processing portion to decode the signal to useful information and/or data. Activation signals for the tactile communication apparatus 100 are then generated based on the decoded information and/or data. The decoded information from the signal receiver and processor 602 controls a switch circuit 604, this circuit receives information from the signal receiver and processor 602 and activates the electro tactile pads 206. The switch circuit 604 activates the electro tactile pads 206 by passing power from a booster circuit 606 through to the individual electro tactile pads 206. The booster circuit 606 is a device that boosts the DC voltage received from the battery to a desired level, thus enabling the user to feel the sensation messages clearly and efficiently.

The tactile communication apparatus 100 is able to facilitate communication with the user 102 by receiving data from the user 102 through input buttons and by transmitting data to the user 102 through the electro tactile pads 206. Information received by the processing section 602 is processed and activation signals for the set of electro tactile pads 206 are generated and sent to the switch circuit 604. The tactile communication apparatus 100 then activates the appropriate sequence of electro tactile pads 206 to convey the information or data to the user 100 through a tactile indication.

Component 610 is an LED circuit that connects to the switch circuit, the LED circuit connects to the same connections as the electro tactile pads 206, it works simultaneously with the activated pads to give a visual indication of which pads are on and to visually show the tactile sensations being sent to the user 102. The LEDs are attached to the LED circuit, when activated they illuminate through a diffuser 612. The diffuser fits into outer case 200. When the internal circuitry activate the electro tactile pads 206, corresponding LEDs illuminate light through diffusers to the external environment.

To keep the tactile communication apparatus 100 firmly positioned on the user's forearm is a strap 202. The strap feeds through an opening on the opposing side of the external casing and when tightened is held in place by a catch. In this example the catch is Velcro layer 614 that is reattach able to strap 202. The tactile communication apparatus 100 may also have protection edges as illustrated in 616 to prevent damage to the outer corners of the apparatus and secure the inner components from excess impact.

Figure 7:
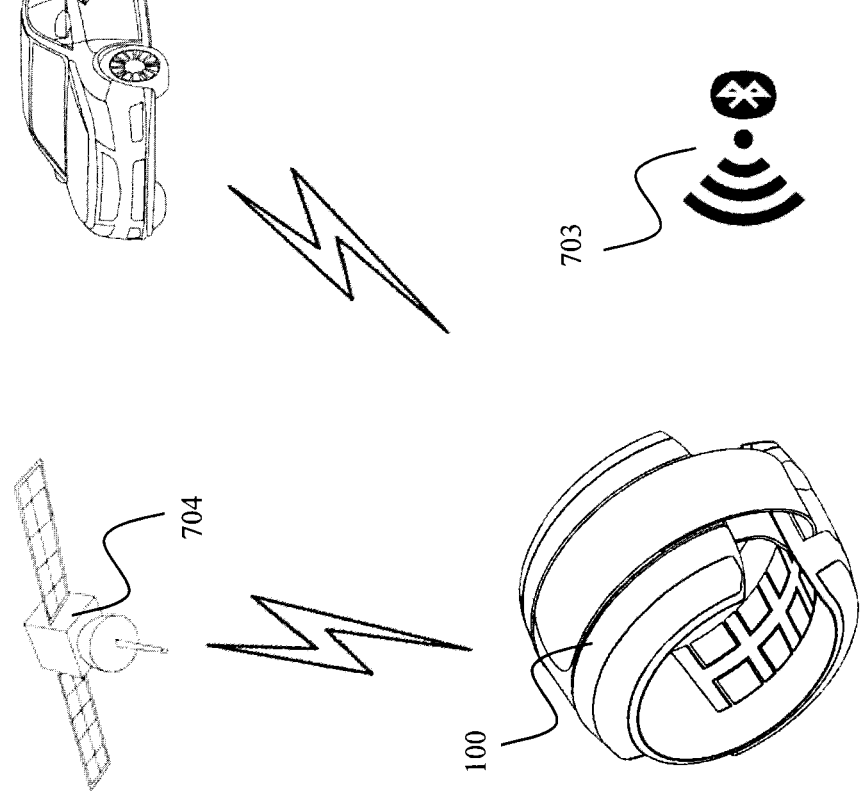
FIG. 7 demonstrates a number of wireless connectable devices for the tactile communication device to connect to according to an exemplary embodiment.

FIG. 7 illustrates some exemplary devices the tactile communication apparatus 100 can communicate with. 702 shows a wireless communication and computer device also known as a Smartphone, the tactile communication apparatus 100 can receive information and data from the Smartphone through a wireless connection such as Bluetooth 703. Other methods of communication maybe via satellite connection 704 to indicate GPS navigation or directions, an automobile connection 706 for indicating such things as the presence of a vehicle in the automobile's blind spot or the speed in which it is travelling for example, and traffic light indicators 708 to communicate the signals on the traffic lights to the user. These are just some other possible exemplary devices the tactile communication apparatus 100 may be used to communicate with.

Figure 8:
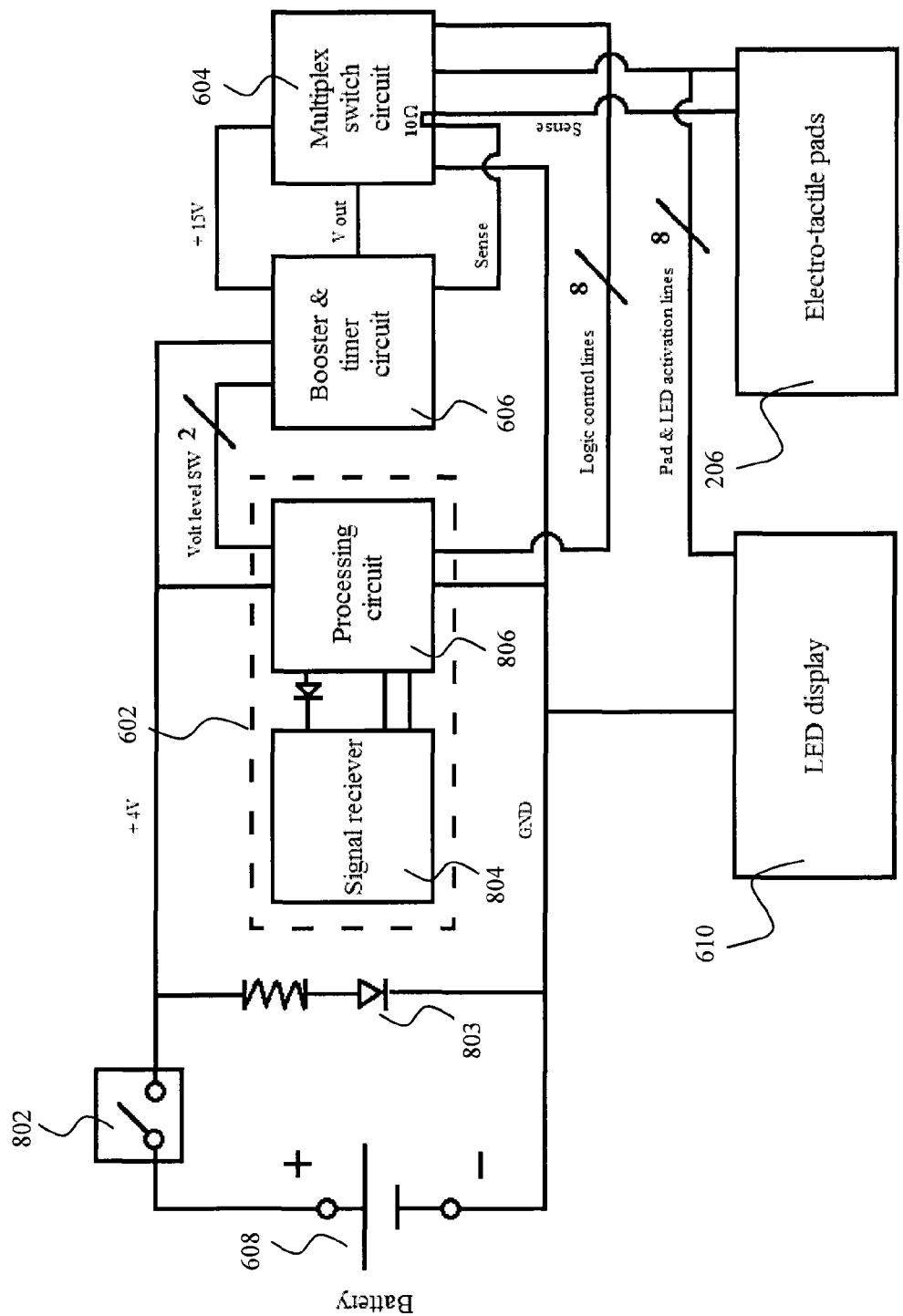
FIG. 8 is a circuit configuration of components for a tactile communication apparatus according to an exemplary embodiment.

FIG. 8 illustrates an exemplary configuration of a circuit layout diagram for the tactile communication apparatus 100. The components depicted in the diagram correspond with the component configuration illustrated in FIG. 6 of the component exploded view of the tactile communication apparatus 100. Starting with the battery 608, the tested configuration incorporated a standard 3.7V Lithion Ion battery as the primary power supply, however the apparatus is not limited to a specific battery type as other battery types can also be used. In the tested example the battery powers all the components in the tactile communication apparatus 100. A switch 802 connects and disconnects the power supply from the internal circuit components of the apparatus, this maybe in the form of a flick switch, a push button, or any form of connecting and disconnecting the power supply. Placed across the ground and positive current lines is an LED illuminating light 803 with the purpose of indicating the tactile communication apparatus 100 is on. A ground line connects from the battery 608 to all the components, the signal receiver and processing circuit 602, the multiplex switch circuit 604, the booster circuit 606, the electro tactile pads 206 and LEDs 610. In this exemplary configuration, the battery voltage is supplied to the signal receiver and processing circuit 602 and the booster circuit 606. The signal receiver and processing unit 602 groups two separate components (a signal receiver and a processor) together to function as a control unit for the apparatus. The signal receiver 804 in the presented exemplary embodiment uses a wireless Bluetooth signal receiver circuit that is able to connect to other wireless Bluetooth enabled devices such as Smart phones and computers to instantly relay information from software they are operating. The Bluetooth signal receiver circuit in the presented exemplary configuration receives power through the processing circuit 806. The processing circuit 806 decodes data that is received by the signal receiver and controls the electro tactile pads 206 in order to communicate the data to the user. In the presented exemplary non-limiting configuration the tactile communication apparatus 100 uses a programmable microprocessor that connects to digital lines on multiplexing switches on the switch circuit 604.

The booster circuit 606 boosts the battery voltage to a higher level, in the presented non-limiting exemplary configuration the booster circuit has 3 output voltage ranges: 12V, 14V and 16V; however, the voltage levels can be readjusted to different values. The voltage value range is adjusted from signals received from the processing circuit 806. Two switch lines enable the power level to either go up to a higher voltage or down to a lower voltage. The boosted voltage line connect to the multiplex switch circuit 604. This circuit receives signals from the signal receiver and processing circuit 602 through digital control lines, the switch circuit 604 connects the boosted voltage line to the various electro tactile pads 206 depending on the data being received from the signal receiver 804. When the electro tactile pads 206 turn on and off, the corresponding LED illuminating lights display which pads are being operated.

Figure 9:
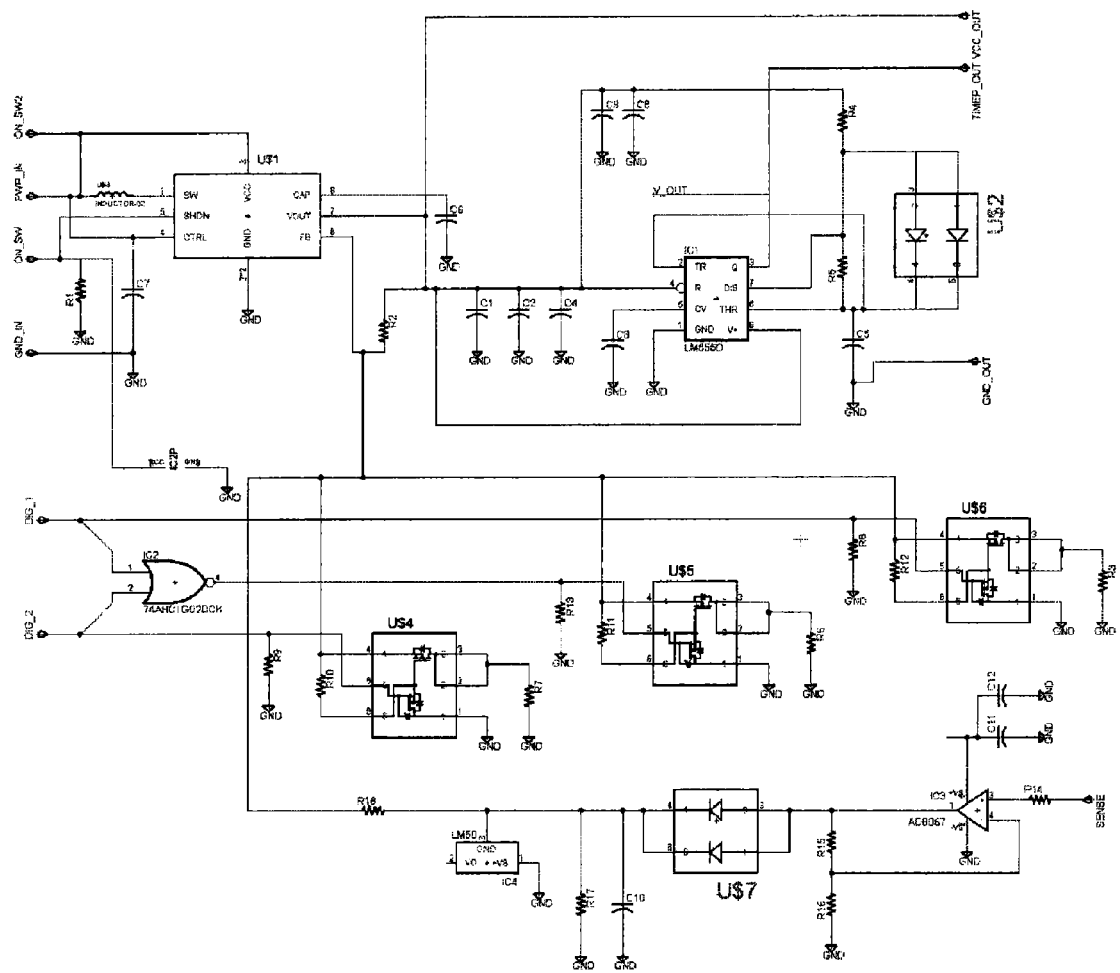
FIG. 9 is a circuit diagram illustrating an exemplary configuration for a power booster circuit that incorporates a timer (stimulus signal generator), booster, and booster level control as well as the adaptive feedback control to the intensity level for electro tactile pads according to an exemplary embodiment.

FIG. 9 depicts a circuit configuration for the booster circuit 606. This exemplary configuration comprises a number of components configured to adjust the voltage and current levels to enable the user to feel information from the tactile communication apparatus 100. The circuit 606 also contains a feedback loop to dynamically adjust the voltage level being sent to the user according to the current sensed at the pads.

Within the exemplary electric circuit 606 design is a stimulus signal generation component, whose primary component in this example is a 555 timer IC. The stimulus signal used in this example is a 5 KHz square wave whose amplitude is set by the booster voltage. Also within the main circuit 606 is a power booster component and three electronic switches to enable the processing circuit to switch between three main voltage levels. All remaining components contribute to the functions of the booster circuit functions.

Figure 10:
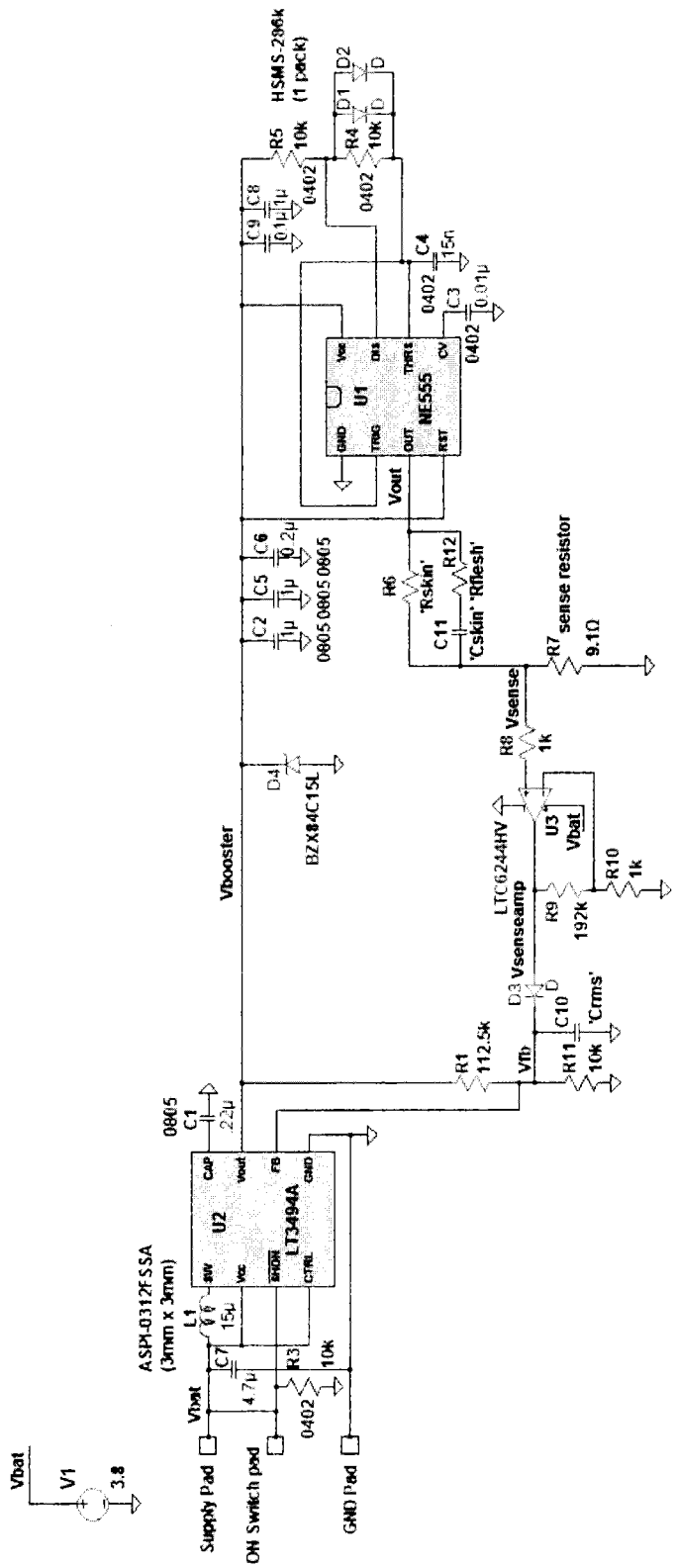
FIG. 10 is a circuit diagram of a voltage amplitude controller to regulate the intensity of the tactile sensation felt by the user according to an exemplary embodiment.

FIG. 10 is a circuit diagram of an exemplary configuration of a feedback loop circuit that functions to calibrate the voltage intensity based on sensing the current being received by the user 102. In situations where the user's skin maybe damp from sweat or is very dry, the conductivity that the electric pulses see would be very high or very low, respectively. Thus, electric pulses of fixed voltage level would induce high or low currents in the tactile pads 206 depending on the skin condition of the user 102, causing intense of mild sensation accordingly. Therefore a feedback mechanism for stabilizing the current level felt by the user is incorporated into the booster circuit 606, whereby a feedback loop indirectly monitors the current level that is received by the user by sensing the current through the tactile pads. In the non limiting exemplary configuration 60 milliamps of localized peak pulsed current was set as an adequate level to provide comfortable sensation to the user. The feedback loop monitors the current level being received by the user, if the conductivity increases then the feedback loop will lower the voltage level to stabilize the sensations felt by the user. Also if the conductivity decreases then the feedback loop increases the voltage level to maintain a consistent level of sensation for the user. The feedback loop connects and controls the booster component in the booster circuit 606, FIG. 10 illustrates an exemplary circuit configuration to enable the voltage boosting to dynamically change in order to maintain a stable current on the conductive electro tactile pads.

Figure 11:
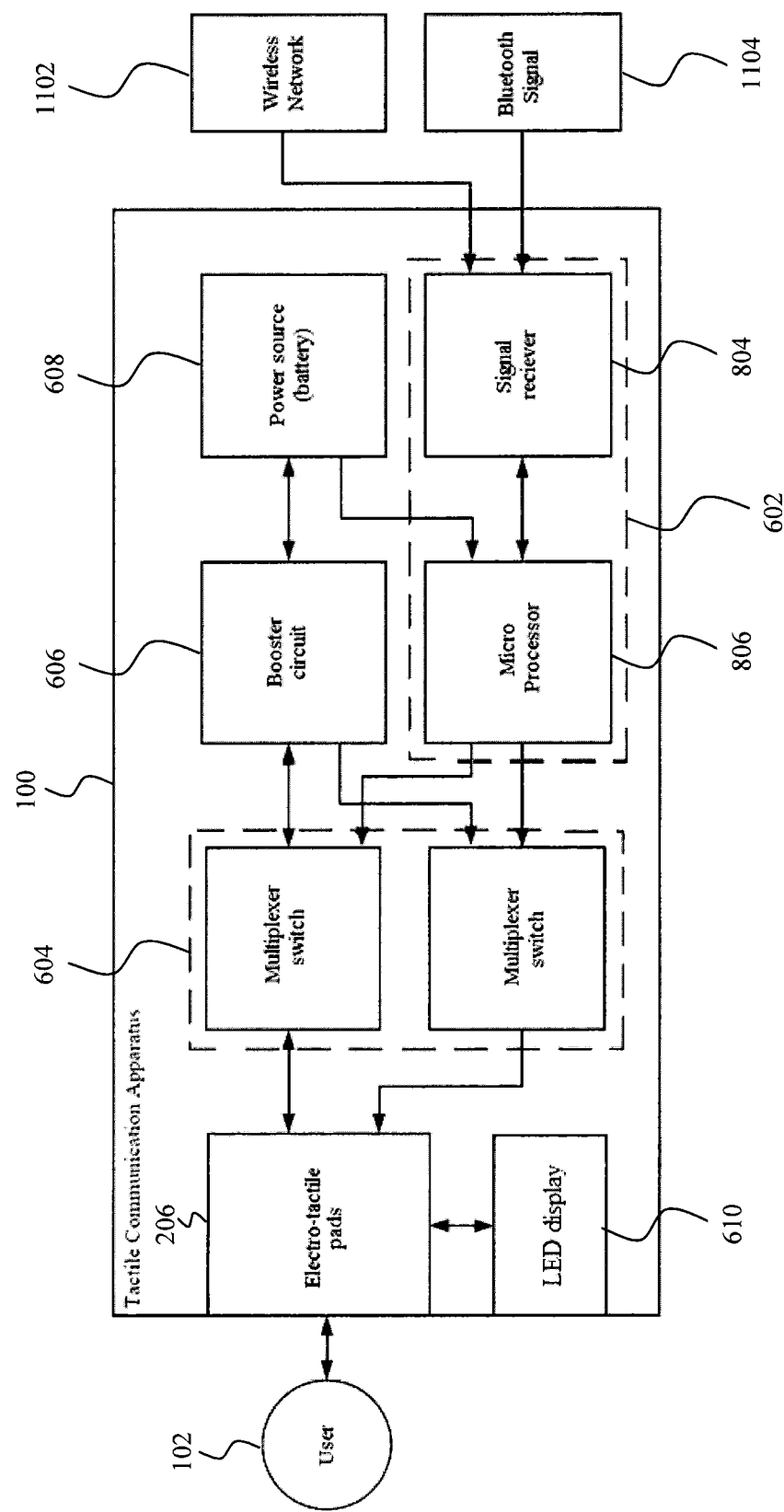
FIG. 11 is a block diagram of a tactile communication apparatus according to an exemplary embodiment.

FIG. 11 is a block diagram of an exemplary tactile communication apparatus 100. Data and information is sent to the tactile communication apparatus 100 via a wireless network 1102 or via a Bluetooth signal 1104. It should also be noted that data and information can also be sent to the tactile communication apparatus 100 via a wired network. The processing section 602 receives the data signal from the wireless network 1102 at the signal receiver 804. The signal receiver 804 decodes the data signal and sends the data to the communication processor 806. The communication processor parses the data and generates pad activation signals via switches 604 that enable the boosted voltage from the booster circuit 606 to be sent to the tactile communication apparatus 100 which physically communicates the data to the user 102 via the electro tactile pads 206.

Figure 12:
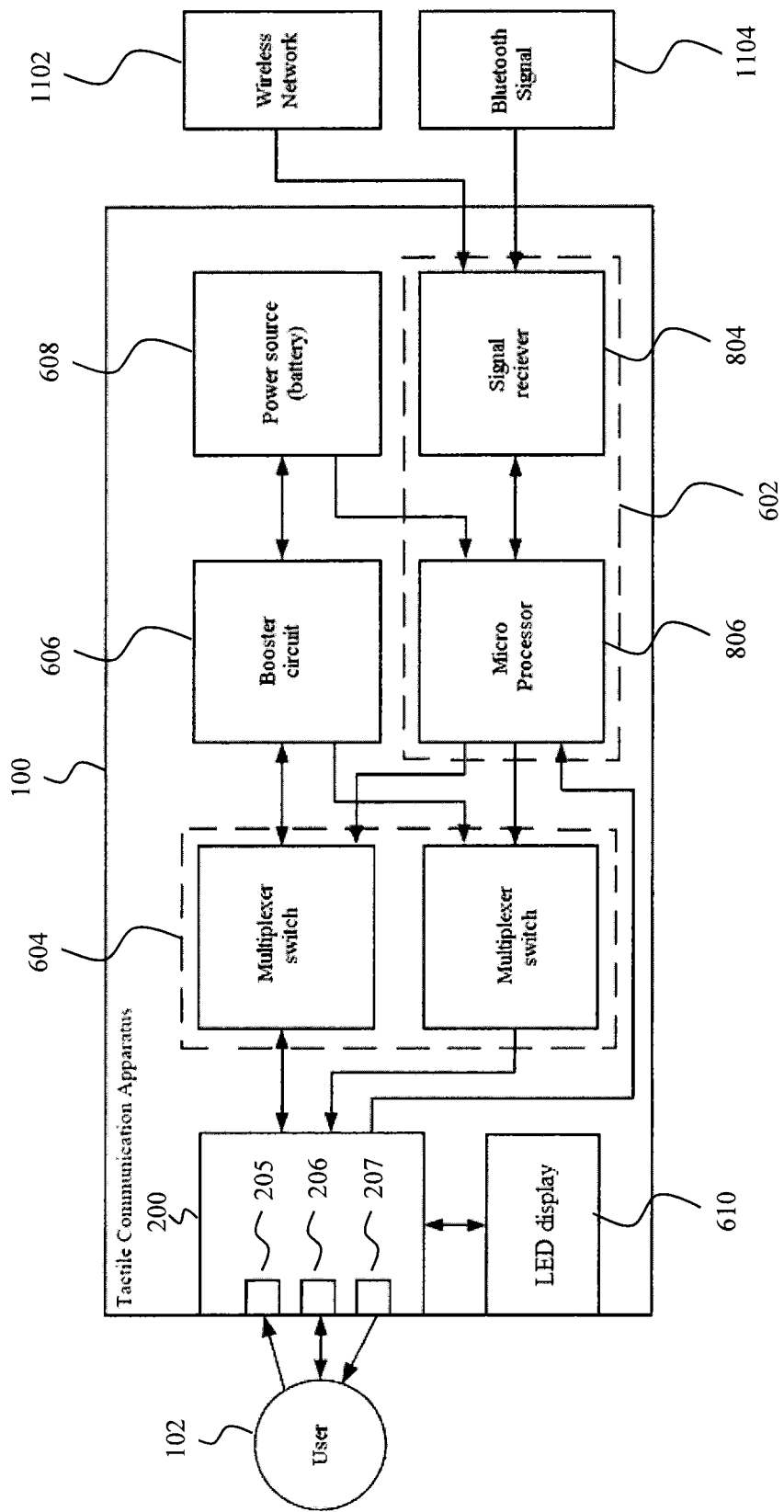
FIG. 12 is a block diagram of a tactile communication apparatus according including an input method and an additional tactile component to an exemplary embodiment.

In another embodiment, FIG. 12 is a block diagram of the tactile communication apparatus 100 illustrating an input method 205 for data and information to be generated by the user 102 on the tactile communication apparatus 100. Push buttons, a touch panel switches, etc. enable the user to input information to the communication processor 806. Also the input apparatus may include a pulse monitor, skin temperature and a motion sensor. The communication processor 806 will process the inputs received from the input component or components 205 and construct a formatted data or information message. The message will be sent to the signal receiver 804 which will generate a data packet based on the medium in which the message will be transmitted and then transmit the data packet to the wired or wireless network 1102 & 1104.

In another embodiment, the tactile communication apparatus 100 can also include a vibration unit 207 to provide an additional means of tactile communication. The vibration unit 207 may be activated to provide general or non specific indication or acknowledgement of an event such as confirmation that a message has been sent, indication that a message has been received, or to notify the user 102 of an error.

Figure 13:
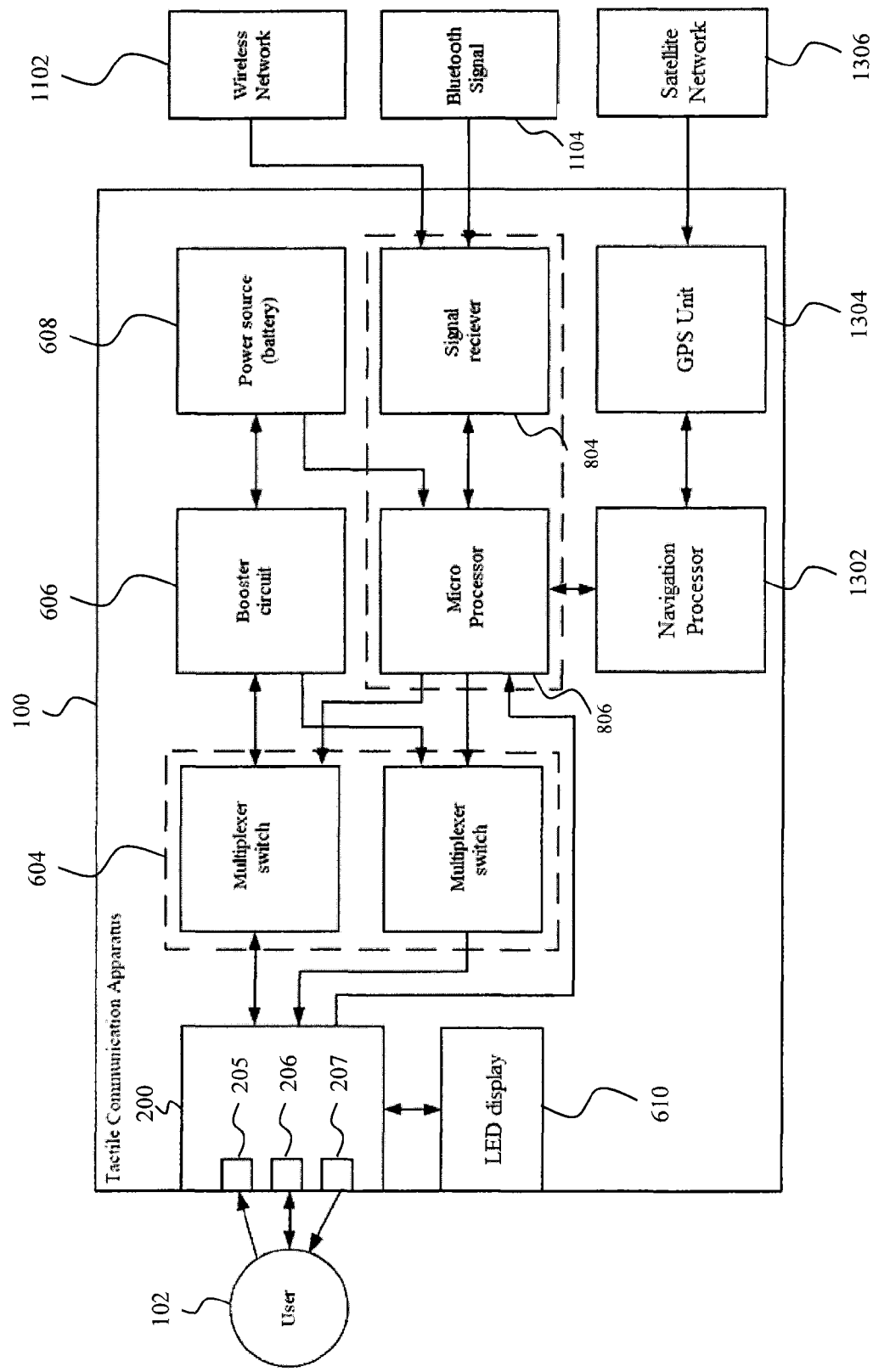
FIG. 13 is a block diagram of a tactile communication apparatus including GPS enabling components according to an exemplary embodiment.

In another embodiment, FIG. 13 is a block diagram of a tactile communication apparatus 100 that can provide position and navigation functionality. In this embodiment, the processing section 806 also contains a GPS unit 1302 that receives position data from a satellite network 1306. The GPS unit calculates a current position based on the received position data and then sends the current position to the navigation processor 1302. The navigation processor 1304 can either relay the current position to the user 102 via the electro tactile pads 206, or update navigation data to a predetermined location or object and provide directional information to the user 102 via the electro tactile pads 206 based on a current position. Directional information, for example, can be provided to the user 102 via relative direction, as illustrated in FIG. 5d. The user 102 can input a desired destination or object to the navigation processor 1302, via an input 205 or via the mobile communication device 702, for which the navigation processor 1302 will calculate directional information. Please note that GPS navigation can also be operated on an application on a Smartphone device as well as on a standalone component within the tactile communication apparatus 100.

Figure 14:
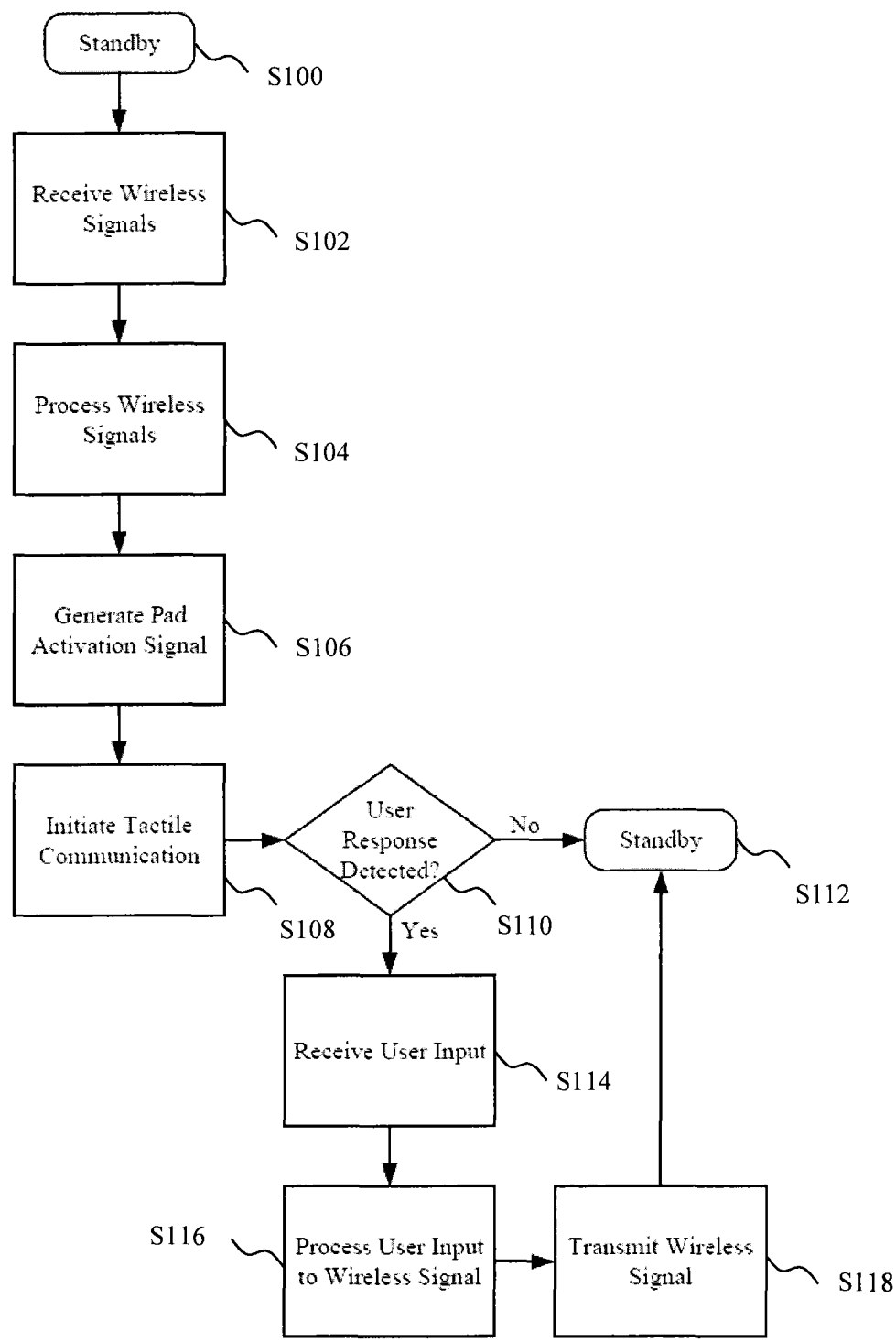
FIG. 14 is a sequence diagram illustrating the communication features of the tactile communication apparatus according to an exemplary embodiment.

FIG. 14 is a sequence diagram of a tactile communication apparatus 100 according to an exemplary embodiment. Initially, the tactile communication apparatus 100 may be standing by at step S100 to receive a wireless signal via the signal receiver 804. When a signal is received by the signal receiver 804 at S102, the signal is decoded or demodulated based on the type of network and protocols which the signal was received. The signal is then processed at the micro processor 806 to produce the data which is to be communicated to the user 100 at step S104. The micro processor 806 generates pad activation signals at step S106 and transmits the pad activation signals to the tactile communication pads 206.

Once the tactile communication pads 206 receive the pad activation signals at step S108 from the micro processor 806 the corresponding pads activate in a specific sequence according to the pad activation signals to communicate the data to the user 102. When the data has been communicated to the user 102 via the tactile communication apparatus 100, the user 102 may provide a response to the data from tactile communication apparatus 100, it maybe via an input method 205 on the apparatus or on their communication device such as a Smartphone application 702 at step S110. If no user response is detected at step S110, the tactile communication apparatus 100 returns to a standby state at step S112. If the user 102 response has been detected at step S110 via an input method 205, the micro processor 806 receives the data from the input component at 205 in step S114. The received data from user 102 is processed at step S116 so as to transmit the data via a wireless signal. Once the data has been encoded or modulated via the appropriate means based on the network, the data is transmitted over the wireless network at step S118. Finally, the tactile communication apparatus 100 returns to standby state at step S112.

Figure 15:
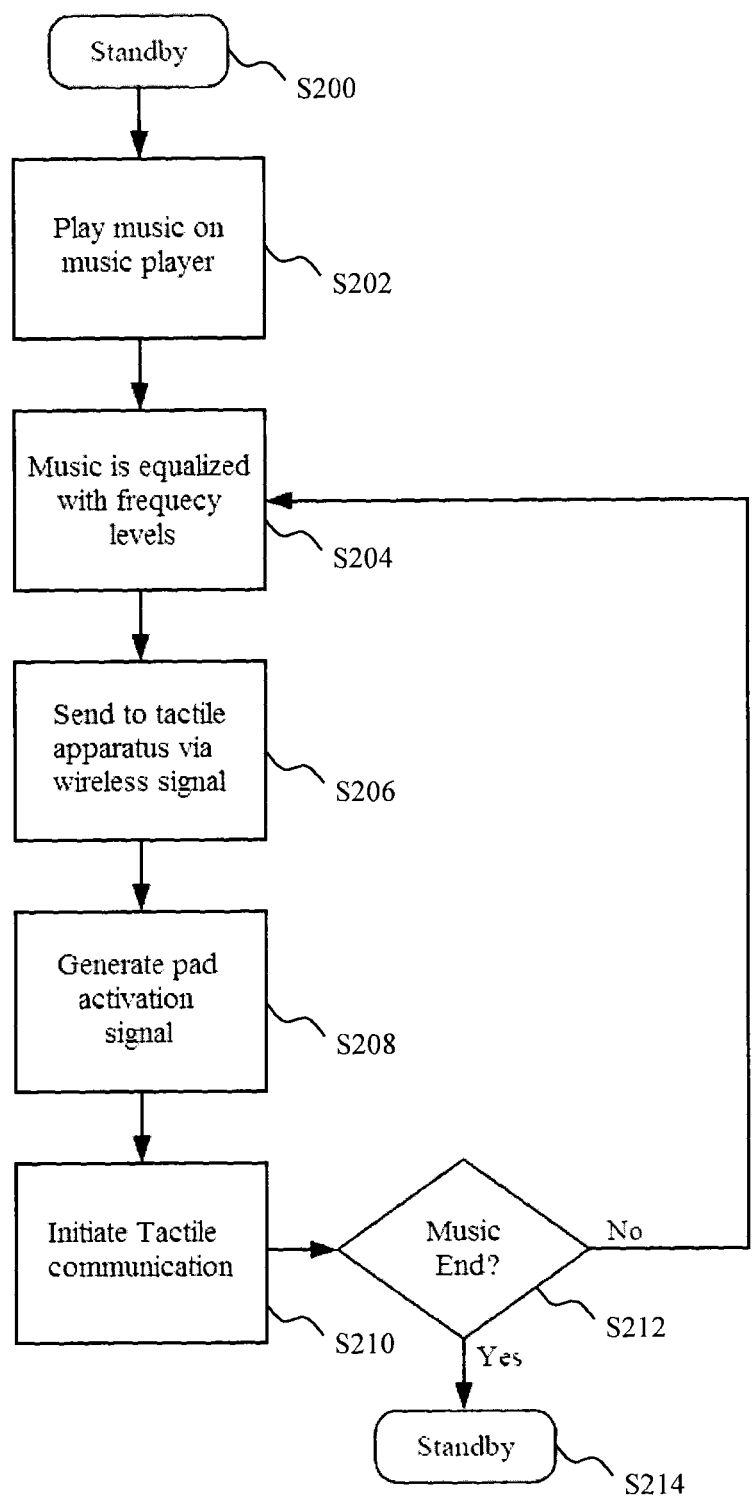
FIG. 15 is a sequence diagram illustrating the tactile communication apparatus working with a music equalization application according to an exemplary embodiment.

According to another embodiment, FIG. 15 is a sequence diagram of a tactile communication apparatus 100 illustrating a music equalization program whereby the user 102 is able to feel sensations generated from music through a frequency equalization application (similar to a graphical music equalizer), the music frequencies are converted to sensations on the tactile communication apparatus 100. Initially, the application maybe on standby S200, music will be activated on a music playing device S202 such as a portable MP3 player, Smartphone, etc. The music will filter in a music equalization software application S204, the high and low frequencies will be divided up and allocated to various tactile communication pads 206. The music player apparatus sends the frequency information through coded data via a wireless signal S206 to the tactile communication apparatus 100. The micro processor 806 generates pad activation signals at step S208 and transmits the pad activation signals to the tactile communication pads 206. Once the tactile communication pads 206 receive the pad activation signals at step S210 the tactile communication apparatus 100 activates the appropriate pads in a specific sequence according to the pad activation signals to communicate the received data to the user 102. The tactile communication apparatus 100 monitors to determine if music is still being played through the music player S212, if the tactile communication apparatus 100 ceases to recognize any music being played then the application will switch to standby S214. However as the music continues to play through the system then music equalization process will repeat S204.

Figure 16:
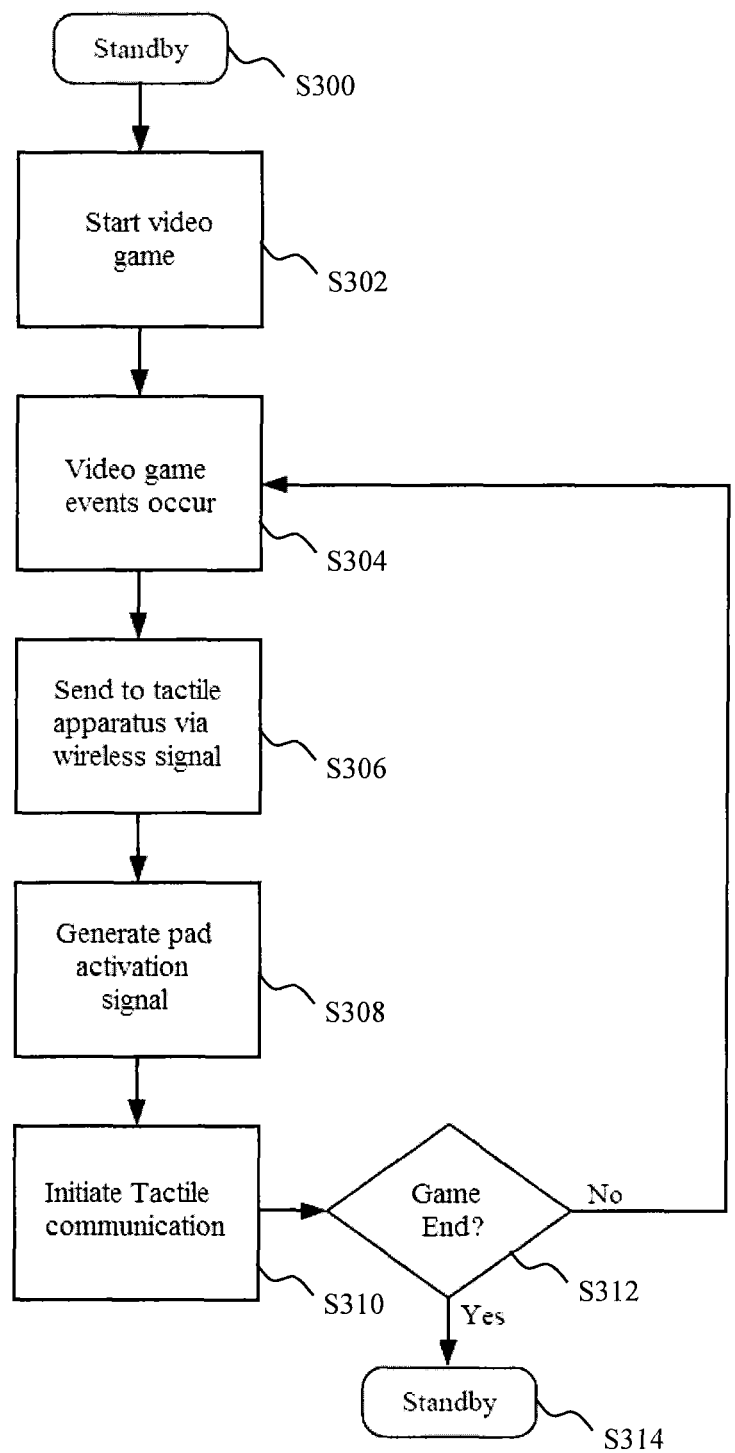
FIG. 16 is a sequence diagram illustrating the tactile communication apparatus working with a video game application according to an exemplary embodiment.

According to another embodiment, FIG. 16 is a sequence diagram of a tactile communication apparatus 100 illustrating a video game connection whereby the user 102 is able to feel game event simulations such as acceleration or a crash in a racing game, another example can be a shot or a hit in an action game application. Tactile sensations conveying game events though tactile sensations can be applicable to nearly any kind of video game. Events are translated to sensations on the tactile communication apparatus 100. Initially, the application maybe on standby S300, a game will start on a game playing device S302 such as a portable videogame player, Smartphone, etc. Events in the game will occur and will create a feedback response S304, the response will translate to tactile sensation similar to examples illustrated in FIG. 5 and activate corresponding tactile communication pads 206. The videogame player apparatus sends the frequency information through coded data via a wireless signal S306 to the tactile communication apparatus 100. The micro processor 806 generates pad activation signals at step S308 and transmits the pin activation signals to the tactile communication pads 206. Once the tactile communication pads 206 receive the pad activation signals at step S310 the tactile communication apparatus 100 activates the appropriate pads in a specific sequence according to the pad activation signals so as to communicate the received data to the user 102. The tactile communication apparatus 100 monitors to determine if the videogame is still being played through the videogame player S312, if the tactile communication apparatus 100 ceases to recognize the game being played then the application will switch to standby S314. However as the videogame continues to be played through the system then the videogame feedback process will repeat S304.

The steps illustrated in FIGS. 15 and 16 can used for a number of applications such as phone calls, messages and warning alerts. The process can be used when synchronizing to an automobile and receiving information from it, such as its acceleration, blind spot notifications, how close the car is to a nearby object (to help when parking), etc. The processes illustrate how the tactile communicator apparatus 100 connects to another apparatus and receives data from it.

Figure 17:
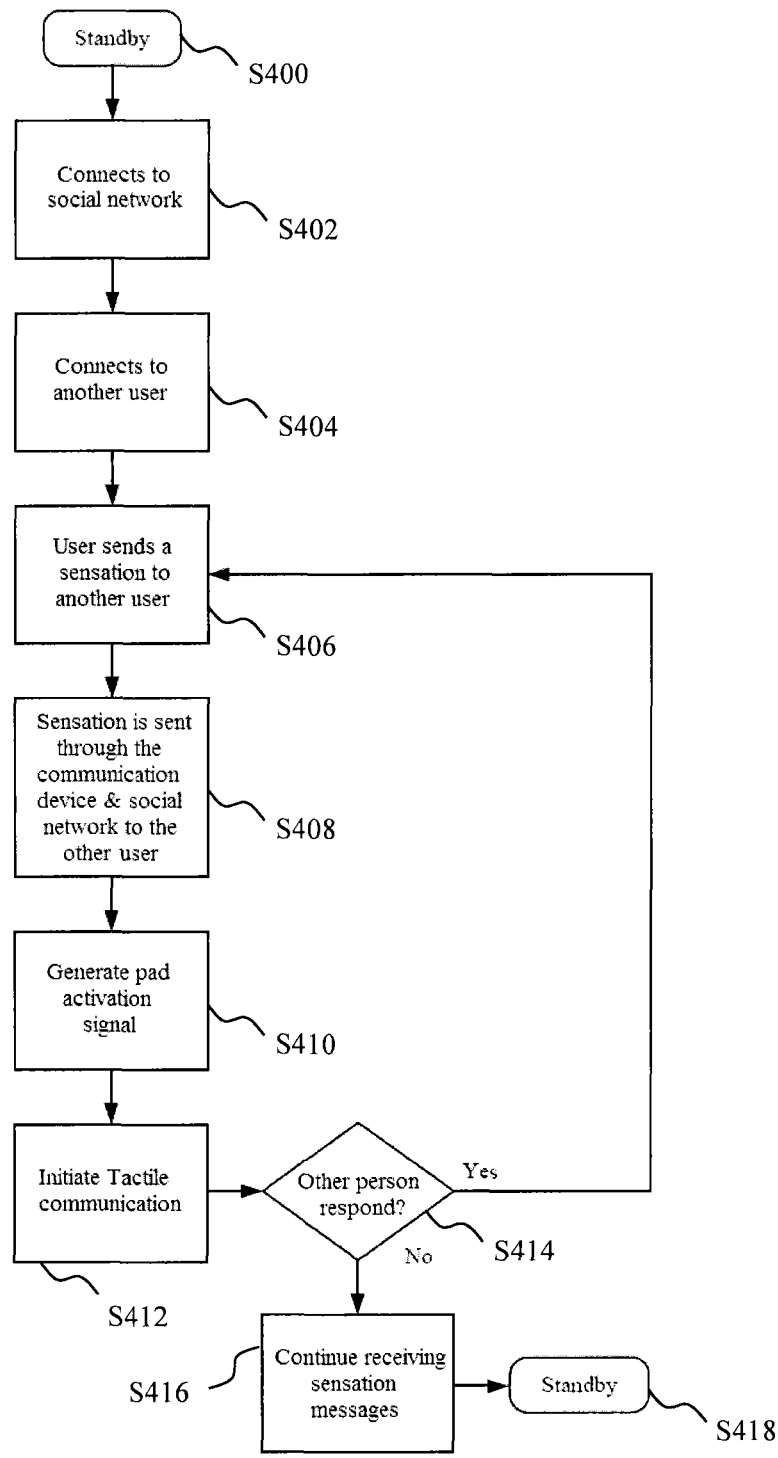
FIG. 17 is sequence diagram illustrating the tactile communication apparatus working with a social networking touch application according to an exemplary embodiment.

According to another embodiment, FIG. 17 is a sequence diagram of a tactile communication apparatus 100 illustrating an application whereby the tactile communicator apparatus 100 is connected through a touch enablement application that synchronizes with social networking. This example demonstrates how two people in two different places connect to each other through a social network application and are able to send each other tactile sensations using the screens of their communication devices and the tactile communication apparatus 100. When one user touches, wipes or slaps the screen or touch panel of their communication device (such as a Smartphone) the movement is transformed into data and sent to the second user to feel instantly on the tactile communication apparatus 100.

Initially, the application maybe on standby 5400, the tactile communication apparatus 100 connects to a social networking application where two or more people can connect to each other S402. Within the social networking application two or more people connect to each other to enable communication between them 5404. As an extension of the normal communication facilities on social networking applications, a user can send a sensation by touching the screen or touch panel of their communication device S406 where the different sections of the screen or touch panel correspond to a tactile pad on the tactile communication apparatus 100 being worn by the other user. The user will also be able to send pre-saved tactile patterns through a wireless network for the corresponding user to receive and feel. The data is sent through the social networking application that uses a long distance connection S408, the corresponding user receives the encoded data S410 that is decoded to relay the sent sensation by activating the electro tactile pads 206, and the sensation is felt by the user S412. The corresponding user is able to respond to communication received S414, the corresponding user may respond back in the same way and the same process for the first user can be used for the second in step S406. The user may not respond and therefore continue to receive tactile information S416. When no more information is being sent then the tactile communication apparatus 100 will enter a standby mode S418.

Figure 18:
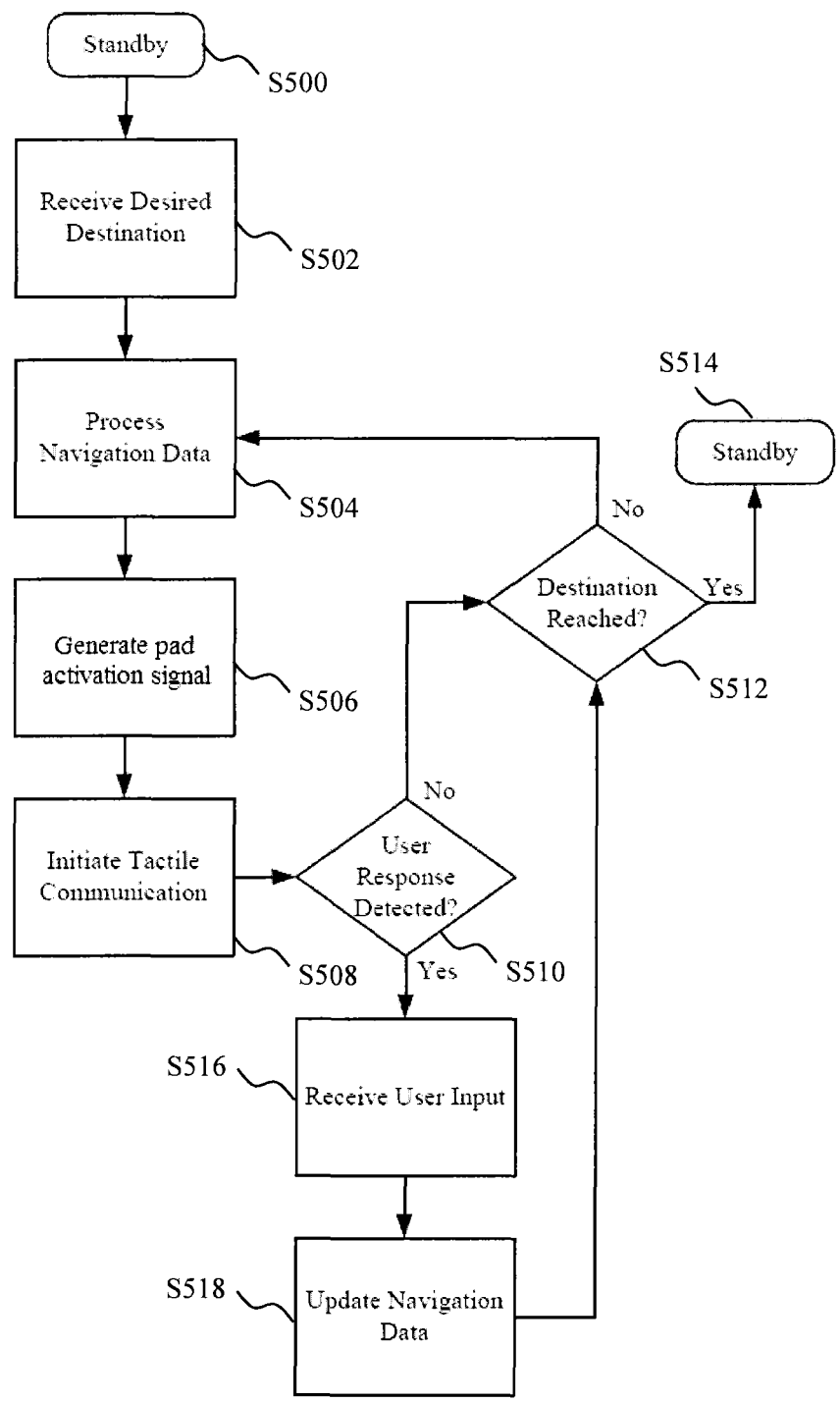
FIG. 18 is sequence diagram illustrating the navigational features of the tactile communication apparatus according to an exemplary embodiment.

According to another embodiment, FIG. 18 is a sequence diagram of a tactile communication apparatus 100 illustrating the features of providing navigational data to a user 102. Initially, the tactile communication apparatus 100 may be on standby at step S500 to receive a desired destination or location from user 102. Once a desired location or destination has been received from a user at step S502, the navigation processor 1302 processes the destination data to produce navigation data at step S504. The navigation processor 1302 also receives GPS data from the GPS unit 1304. Once the navigational data has been generated by the navigation processor 1302 at step S504 the navigation processor 1302 generates pin activation signals at step S506 to communicate the navigation data to the user 102. Activation signals are received at the tactile communication device 100 at step S508 which initiates the tactile communication of the navigation data to the user 102. When the navigational data is being communicated to the user 102 the user may respond or continue to follow the navigation data at step S510. If the user provides no response and continues to follow the navigation data at step S510, a further determination will be made based on the continued supply of GPS data from the GPS unit 1304 to determine if the user 102 has reached the desired destination at step S512. If the desired destination has not yet been reached at step S512 the tactile communication apparatus 100 continues to process navigation data at step S504 to continue to guide the user 102 to the desired destination. If a desired destination has been determined to be reached at step S512 the tactile communication apparatus 100 returns to a standby state at step S514. Upon receiving tactile indication at step S508, the user 102 may respond to provide updated destination information or corrections at step S510. If user 102 response has been detected at step S510 the navigation processor 1302 receives input from step S516 and then processes that information at step S518 to update or correct navigational data. The tactile communication apparatus 100 then determines if the new destination has been reached at step S512. If the new destination has not yet been reached at step S512 the tactile communication apparatus 100 continues to process navigation data at step S504. Otherwise the tactile communication apparatus 100 enters into a standby state once the new destination has been reached at step S514.

Figure 19:
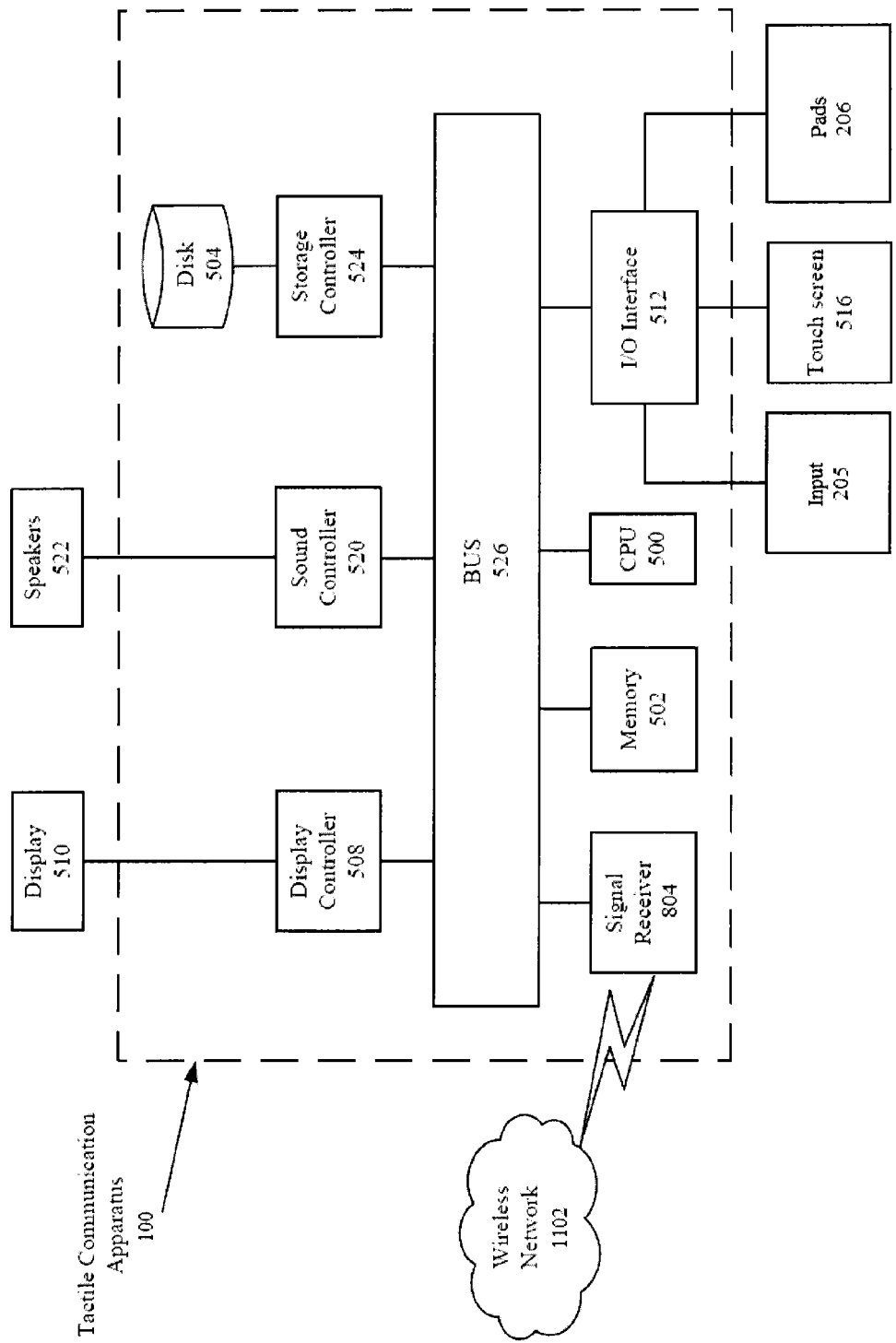
FIG. 19 is a hardware block diagram of a target tracking processor according to an exemplary embodiment.

Next, a hardware description of the tactile communication apparatus 100 according to exemplary embodiments is described with reference to FIG. 19. In FIG. 19, the tactile communication apparatus 100 includes a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the tactile communication apparatus 100 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The tactile communication apparatus 100 in FIG. 19 also includes a signal receiver 804, such as an Intel Ethernet PRO network interface card from Intel Corporation of America, for interfacing with wireless network 1102. As can be appreciated, the wireless network 1102 can be a public network, such as the Internet, or a private network such as an LAN or WAN network, or any combination thereof and can also include PSTN or ISDN sub-networks. The wireless network 1102 can also be wired, such as an Ethernet network, or can be wireless such as a cellular network including EDGE, 3G and 4G wireless cellular systems. The wireless network can also be WiFi, Bluetooth, or any other wireless form of communication that is known.

The mobile tracking and tactile communication apparatus 100 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with an input Controller 205 as well as a touch screen panel 516 on or separate from display 510. General purpose I/O interface also connects to a plurality of electro tactile pads 206.

A sound controller 520 is also provided in the tactile communication apparatus 100, such as Sound Blaster X-Fi Titanium from Creative, to interface with speakers/microphone 522 thereby providing sounds and/or music. The speakers/microphone 522 can also be used to accept dictated words as commands for controlling the tactile communication apparatus 100 or for providing location and/or property information with respect to the target property.

The general purpose storage controller 524 connects the storage medium disk 504 with communication bus 526, which may be an ISA, EISA, VESA, PCI, or similar, for interconnecting all of the components of the tactile communication apparatus 100. A description of the general features and functionality of the display 510, as well as the display controller 508, storage controller 524, network controller 506, and sound controller 520 is omitted herein for brevity as these features are known.

What is claimed is:

1. A tactile communication apparatus comprising:
a signal receiver configured to receive a wireless signal including data;
a plurality of electro tactile pads spaced apart from one another on one side of the tactile communication apparatus thereof, each electro tactile pad configured to be driven by a corresponding activation control signal such that selective activation of subsets of the plurality of electro tactile pads as driven by corresponding activation control signals convey a plurality of electro tactile sensation combinations to a user; and
circuitry configured to generate the activation control signals based on the received data so as to convey the received data tactilely to the user through the plurality of electro tactile sensation combinations when the one side of the tactile communication apparatus is contacting the user,
wherein the circuitry is configured to detect a level of current sensed at the plurality of electro tactile pads, and to dynamically adjust a battery voltage of the tactile communication apparatus based on the detected level of current so as to maintain the detected level of current at a predetermined level in a first mode of operation.

2. The tactile communication apparatus of claim 1, wherein
the data includes digital music, and
the circuitry is configured to generate the activation control signals to create the plurality of electro tactile sensation combinations with stimulation amounts corresponding to predetermined frequency bands of the digital music, a lower frequency band causing activation of at least one of the plurality of electro tactile pads on one end of the tactile communication apparatus and a higher frequency band causing activation of at least another one of the plurality of electro tactile pads at another end of the tactile communications apparatus.

3. The tactile communication apparatus of claim 1, wherein
the data includes a video game event, and
the circuitry is configured to generate the activation control signals to create the plurality of electro tactile sensation combinations with stimulation amounts and distributions corresponding to video game events in a video game.

4. The tactile communication apparatus of claim 3, wherein
the stimulation amounts and distributions are predefined to represent alerts or events in an application.

5. The tactile communication apparatus of claim 1, wherein
the data is from another tactile communication apparatus and is created by capturing a touch of another person on the another tactile communication apparatus, such that a corresponding sensation is felt by the user via the plurality of electro tactile sensation combinations.

6. The tactile communication apparatus of claim 1, wherein
the one side of the tactile communication apparatus including the plurality of electro tactile pads is ergonomically shaped to match an opposing surface of a forearm of the user such that the plurality of electro tactile pads contact the forearm of the user.

7. The tactile communication apparatus of claim 1, further comprising:
a plurality of buttons and sensors disposed on a side opposite to the one side on which the plurality of electro tactile pads are disposed, the plurality of buttons and sensors being configured to be actuated by the user as a user interface to control the tactile communication apparatus.

8. The tactile communication apparatus of claim 1, further comprising:
a GPS unit that generates navigation data or a downloadable navigation application that when executed by the circuitry generates navigation data, wherein
the circuitry is configured to generate the activation control signals to create the plurality of electro tactile sensation combinations with stimulation amounts and distributions corresponding to position or navigation direction information.

9. A tactile communication method, the method comprising:
receiving input data via a wireless signal;
generating, using circuitry, a plurality of activation control signals based on the input data, the plurality of activation control signals controllably activating a plurality of electro tactile pads spaced apart from one another on a tactile communication device, each electro tactile pad configured to be driven by a corresponding activation control signal such that selective activation of subsets of the plurality of electro tactile pads as driven by corresponding activation control signals convey a plurality of electro tactile sensation combinations to a user; and,
detecting, using the circuitry, a level of current sensed at the plurality of electro tactile pads, and dynamically adjusting, using the circuitry, a battery voltage of the tactile communication device based on the detected level of current so as to maintain the detected level of current at a predetermined level in a first mode of operation.

10. A non-transitory computer-readable storage medium with computer readable instructions stored therein that, when executed by a computer, cause the computer to execute a method comprising:
receiving input data via a wireless signal;
generating, using circuitry, a plurality of activation control signals based on the input data, the plurality of activation control signals controllably activating a plurality of electro tactile pads spaced apart from one another on a tactile communication device, each electro tactile pad configured to be driven by a corresponding activation control signal such that selective activation of subsets of the plurality of electro tactile pads as driven by corresponding activation control signals convey a plurality of electro tactile sensation combinations to a user; and,
detecting, using the circuitry, a level of current sensed at the plurality of electro tactile pads, and dynamically adjusting, using the circuitry, a battery voltage of the tactile communication device based on the detected level of current so as to maintain the detected level of current at a predetermined level in a first mode of operation.

11. The tactile communication apparatus of claim 1, wherein the circuitry is configured to:
receive a user instruction, and
adjust the battery voltage of the tactile communication apparatus based on the received user instruction so as to adjust the detected level of current sensed at the plurality of electro tactile pads in a second mode of operation.

12. The tactile communication apparatus of claim 11, wherein the user instruction includes a user selection of a voltage level for the tactile communication apparatus from at least three different voltage level selections.

13. The tactile communication apparatus of claim 12, wherein the at least three different voltage level selections include 12V, 14V, and 16V.

14. The tactile communication apparatus of claim 1, wherein the plurality of electro tactile sensation combinations include at least one of a wave pattern, a pulse pattern, a circle pattern, a direction pattern, or a twist pattern.

15. The tactile communication method of claim 9, further comprising:
  receiving a user instruction; and
  adjusting the battery voltage of the tactile communication device based on the received user instruction so as to adjust the detected level of current sensed at the plurality of electro tactile pads in a second mode of operation.

16. The tactile communication method of claim 15, wherein the user instruction includes a user selection of a voltage level for the tactile communication device from at least three different voltage level selections.

17. The tactile communication method of claim 16, wherein the at least three different voltage level selections include 12V, 14V, and 16V.

18. The tactile communication method of claim 9, wherein the plurality of electro tactile sensation combinations include at least one of a wave pattern, a pulse pattern, a circle pattern, a direction pattern, or a twist pattern.

19. The tactile communication method of claim 9, wherein the plurality of activation control signals create the plurality of electro tactile sensation combinations according to a pattern of music frequencies, video game events, social networking touch activations, or directional indications.

20. The non-transitory computer-readable storage medium according to claim 10, herein the plurality of activation control signals create the plurality of electro tactile sensation combinations according to a pattern of music frequencies, video game events, social networking touch activations, or directional indications.

* * * * *